July 22, 1969  J. E. P. PICKETT  3,456,300
COMPOSITE HISTOLOGIC TISSUE RECEPTACLE AND EMBEDDING STRUCTURE
Filed June 5, 1967  2 Sheets-Sheet 1
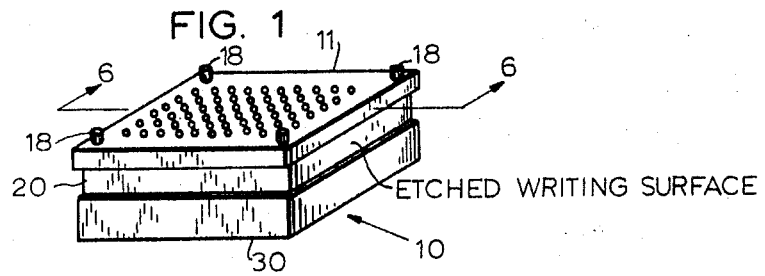
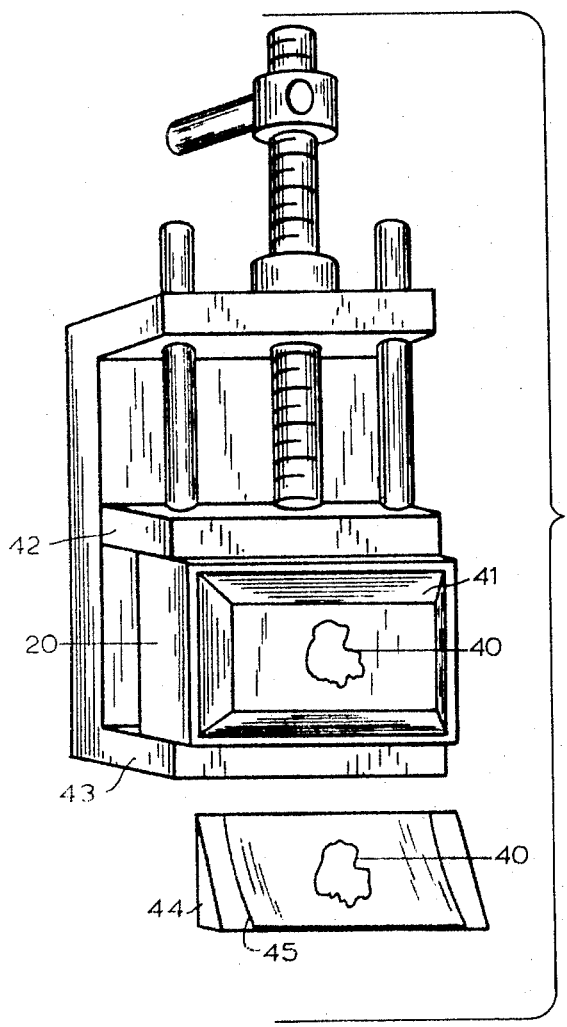
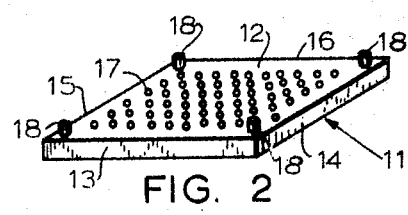
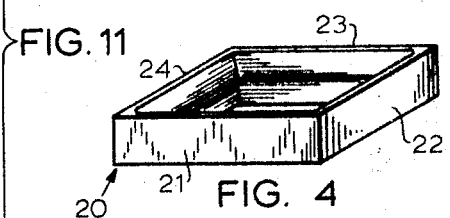
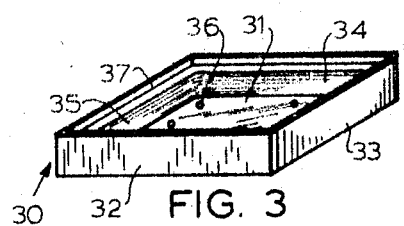
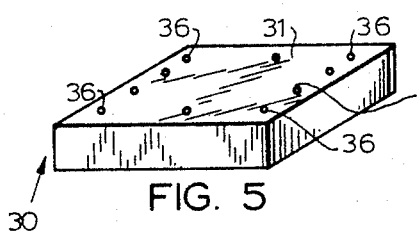
INVENTOR.
John E. P. Pickett
BY
ATTORNEYS

*INVENTOR.*
John E. P. Pickett

ATTORNEYS

United States Patent Office 3,456,300
Patented July 22, 1969

3,456,300
COMPOSITE HISTOLOGIC TISSUE RECEPTACLE AND EMBEDDING STRUCTURE
John E. P. Pickett, 3323 Pinafore Drive, Durham, N.C. 27705
Filed June 5, 1967, Ser. No. 643,537
Int. Cl. B29c 1/00, 1/02, 1/14
U.S. Cl. 18—34                                                9 Claims

ABSTRACT OF THE DISCLOSURE

A three-part histologic tissue receptacle and embedding structure comprises a central rectangular mold having open ends and smooth exterior and interior walls, a substantially perforated top which can be snap-fastened to either end of the mold and a base pan which can be snap-fastened to either end of the mold opposite the top and having a slightly perforated bottom wall. The mold, top and pan elements of the structure may be arranged for service as a perforate, integral receptacle for holding and transporting the tissue specimen through various liquids during processing, as a mold for embedding the specimen, as a holder for holding the embedded specimen in a microtone during slicing and after slicing, as a housing for holding and protecting the remains of the embedded specimen during extended storage.

CROSS-REFERENCE TO RELATED APPLICATION

The present invention relates to and is an improvement over an application Ser. No. 555,630, filed by me on June 6, 1966. The present and the subject copending applications are related in that each of the inventions teaches a composite histologic tissue receptacle and embedding structure which is comprised of a perforated top, an open ended box or mold which receives the top and a boat or base pan which is also mounted onto the open ended box.

BACKGROUND OF THE INVENTION

Field of the invention

This invention relates to a composite histologic tissue receptacle and embedding structure which serves as an integral, perforate receptacle for holding tissue during the processing thereof, as a mold for embedding processed tissue in a paraffin body preparatory to mounting in the microtome, as a means for aligning and holding the embedded specimen in the microtome and as a receptacle for protecting and storing the embedded tissue after portions of the same have been severed by the microtome. Devices of this type may be classified under class 18, subclass 5 which is plastic molding devices or class 18, subclass 26, which is casting plastic molding devices.

Description of the prior art

An embedding structure of the type most closely related to this invention is taught by U.S. Patent No. 2,996,762 to McCormick. The structure as taught by this reference includes an embedding box which is comprised of a boat receptacle and a paraffin housing structure which is adapted to be received by the microtome device. The housing structure is loosely placed or seated on the boat receptacle after the tissue specimen has been positioned in the boat receptacle and the composite structure is filled with liquid paraffin. The boat receptacle is removed from the housing structure after the paraffin has hardened and may be reused or discarded while the housing structure in which the paraffin tissue block remains may be placed in the microtome and have certain sections cut from the same after which the remainder of the paraffin block and the housing structure is catalogued and filed for future reference. The housing structure is provided with internal projections which secure the molded block to the housing and with an external flange which is required for the same to be placed in a microtome device in alignment with the microtome cutting blade. The internal projections interfere with positioning of the specimen and thus it has been the practice to position the tissue specimen in the boat receptacle before seating the housing structure on the boat receptacle.

In order to prepare a tissue specimen to be placed into the embedding structure of McCormick, the tissue specimen must first be exposed to the usual processing liquids such as alcohol, xylene, liquid paraffin and the like and which under conventional practice requires a separate type of receptacle for holding the tissue. That is, unlike the mold and pan elements of the present invention, the McCormick housing and boat elements have no utility as a processing receptacle and consequently a separate structure is required. A representative processing receptacle of this type is taught by U.S. Patent No. 3,129,902 to Barnam which includes a perforated steel body and a perforated cover which is adapted to be snapped onto the receptacle body. The tissue specimen is loosely held in the receptacle during processing and the cover and steel body may be disposed of after use or may be cleaned for reuse.

From the foregoing, it is evident that according to the prior art the tissue specimen must first be placed in one type of perforate receptacle for passing through the various processing liquids after which the tissue specimen must be removed therefrom and transferred into another type of receptacle for embedding. Neither type receptacle is suitable for purposes of the other. Furthermore, the first receptacle must be labelled to identify the tissue specimen and the indicia must be recopied onto the second receptacle, i.e., the embedding box. Thus, human error is often encountered in the transferral of indicia from the receptacle to the embedding box and since a pathologist is to examine the tissue specimen for various diseases including malignancies, such errors could be catastrophic in result. Furthermore, the process of transferring the tissue specimen from the tissue receptacle to the embedding box and positioning the tissue specimen in the boat receptacle and assembling the embedding box is time consuming and inefficient. Also, since the tissue receptacle and embedding box parts are not interchangeable, the disposable portions and the reuseable portions are unduly multiplied thus increasing the economic loss attributable to each tissue specimen so processed. With the numbers of specimens and sections processed daily in a large hospital being in the order of hundreds and thousands respectively and with the need for accuracy, speed of processing and minimum cost, the economic and practical importance of the details of the methods and devices used in tissue processing and embedding is readily seen. For example, it has been observed that the internal configurations or projections found in the prior art embedding box require the technician to adjust the specimen in the boat receptacle before seating the embedding box on the boat receptacle since it is impractical to adjust the specimen in the boat receptacle by reaching through the embedding box with tweezers or the like. Furthermore, since the embedding box is only loosely seated on the boat receptacle it has been observed that considerable time is lost in simply checking prior to embedding to see that the embedding box is properly seated on the boat receptacle.

SUMMARY OF THE INVENTION

The composite tissue receptacle and embedding structure of the invention is comprised of an open mold, a base pan which is detachably secured onto either open end of the open mold and a perforated top which is detachably secured onto the other end of the open mold all of which form an integral closure for the specimen. By reason of the invention each element may be molded of the same kind of material so long as such material is moldable and inert to the various processing fluids. The open mold element is rectangular in cross section and includes four perpendicular and interconnecting walls having smooth interior and exterior surfaces which are devoid of flanges or projections as in the referred to McCormick structure. The width and length of the open mold are preferably limited to about one and one-half inches long by one inch wide with the depth of the same being about three-eighths of one inch. By limiting the dimensions of the upper mold to that previously described, it is adapted to be received by a conventional tissue file drawer upon the storage of the same. At least one outer surface of the upper mold is preferably etched in order to receive indicia by means of an ordinary pencil. The base pan is shaped substantially like a rectangular open topped box having a thin, heat conducting, flat bottom surface and an indented ledge which extends downwardly from the inside edge of the base pan walls so as to snap fit onto either end of the open mold. The bottom surface also provides an area which can be etched to accommodate extra information. The flat bottom surface is provided with a plurality of small openings which are preferably located in the corners and edges adjacent the side walls and which allow the processing fluids to pass through the composite tissue embedding structure. The perforated top which is adapted to be detachably secured to the other end of the open mold consists of a perforated rectangular shaped surface having outwardly projecting sides which are adapted to snap fit over the end of the open mold. The top element in conjunction with the mold and pan elements thus form an integral perforate structure which can be inverted, tilted and otherwise handled without coming apart.

In utilizing the invention, a tissue specimen which is to be pathologically examined is placed in the base pan without regard to any particular position. One end of the open mold is snap-fastened to the base pan and the other end of the mold is snap-fastened to the perforated top to provide the mentioned integral, perforate enclosure for the specimen. The serial number of the tissue specimen is marked by means of a graphite pencil or the like onto an etched surface of the open mold. The mold with the top cover and base pan snap-fastened to it at either end is at this stage providing a perforate tissue processing receptacle capable of serving all the purposes conventionally served by the processing receptacle of the referred to Barnam type. The specimen is now conditioned for the first fixation step which prevents autolization of the specimen and prepares the specimen for embedding. The composite tissue embedding structure is placed sequentially into various treating liquids such as alcohol, xylene and finally into a paraffin bath wherepon quantities of paraffin are transferred by osmosis into the tissue cells. The bottom outside surface is quickly wiped to remove excess paraffin. Also, a thin film of paraffin coats the bottom inside surface of the boat receptacle and while the paraffin is still hot and tacky, the perforated top is removed and after adding additional liquid paraffin, the specimen is repositioned on the flat bottom surface of the base pan into a precise cutting position. The paraffin is allowed to harden so that the precise plane of the specimen along which it is to be severed is presented to the microtome blade. The positioning of the specimen is most important for frequently the only means for determining the malignancy of tissue is by properly selecting the plane of severance. As an alternative, the thin coating of paraffin clinging to the bottom surface of the boat receptacle may be allowed to harden and later reheated and the tissue specimen repositioned. In either case the tissue specimen may be positioned while the mold and base pan are snap-fastened together since the mold itself is free of the internal projections found in the prior art mold and since the mold and base pan have a snap-fastening relation rather than a loose-seating relation as in the prior art.

After the tissue specimen has been selectively positioned in the base pan, melted paraffin is poured into the base pan through the open end of the open mold to a level which is substantially adjacent that open end thus completely embedding the tissue specimen after accounting for the shrinkage of the paraffin upon solidification. The paraffin is allowed to cool and the cooling may be hastened by placing the base pan and open mold on a cold surface. After the paraffin has hardened and approaches room temperature, the tissue specimen is adapted to be presented to the blade of the microtome. Thus, while the base pan remains snap-fastened to the open mold, the composite structure is placed in the jaws of the microtome whereby the jaws abut against the exposed surface of the edges of the base pan which acts to align the cutting surface of the paraffin block with the microtome blade.

It may be noted here that the structure of the invention eliminates need for aligning flanges on the mold itself since the base pan edges of the invention structure are so arranged that they furnish a means for obtaining alignment of the paraffin block with the microtome. After such alignment the jaws of the microtome are tightened onto the open mold and the base pan is removed therefrom which exposes the bottom surface of the block for cutting. After one or several sections have been sliced from the tissue specimen by the microtome knife, the base pan may be snap-fastened back onto the open mold so as to cover the exposed tissue specimen surface and prevent the same from becoming soiled or damaged during the usual extended storage for possible later reference to the same patient. At any later time, the tissue specimen may be removed from storage and made available for further sectioning by removing the same from the storage drawer and inserting it into the microtome as described above. The absence of flanges on the mold as found in the prior art facilitates storage of more units in the same space and the ability of the base pan to act as a protective cover provides a form of storage protection not heretofore available.

Therefore, an object of this invention is to provide a composite histologic receptacle and embedding structure which is economical to manufacture and to use.

Yet another object of this invention is to provide an efficient and economical apparatus for processing a tissue specimen through the various processing fluids and for embedding the tissue specimen in a paraffin body by the use of a receptacle which is common to both the processing and embedding steps.

A further object of this invention is to provide a composite histologic embedding structure with an open mold and a perforated top which is adapted to be releasably secured to either open end of the open mold.

Still another object of this invention is to provide a composite histologic embedding structure with an open mold and a base pan which may be secured to either end of the open mold and which serves the additional functions of aligning the mold in the jaws of a microtome and following slicing of protecting the remaining specimen.

Still another object of this invention is to provide a composite histologic embedding structure which is comprised of elements which do not have laterally projecting external or internal projections or like configurations.

Other objects and advantages of this invention will become apparent when the following detailed description is read in conjunction with the appended drawings and claims. A preferred embodiment of this invention will now be described with reference to the accompanying drawings, in which:

DESCRIPTION OF THE DRAWINGS

FIGURE 1 is a perspective view of the composite histologic tissue receptacle and embedding structure of this invention showing the various elements in an interconnected relationship;

FIGURE 2 is a perspective view of the perforated top;

FIGURE 3 is a perspective view of the base pan;

FIGURE 4 is a perspective view of the open mold;

FIGURE 5 is a perspective view of the base pan showing the drainage holes located therein;

FIGURE 11 is an enlarged pictorial view of the tissue specimen as it appears embedded in the open mold and mounted for cutting by the microtome.

DETAILED DESCRIPTION OF THE PREFERRED EMBODIMENT

Figure 7:
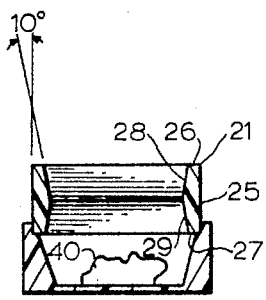
FIGURE 7 is the section view of FIGURE 6 showing the perforated top removed and the structure arranged as a mold to receive melted paraffin for embedding the tissue specimen in a paraffin block.
Figure 6:
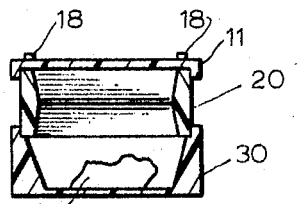
FIGURE 6 is a section view taken along lines 6—6 of FIGURE 1 and showing the invention structure as it appears in service as a receptacle for receiving and processing a tissue specimen through the various processing liquids.
Figure 8:
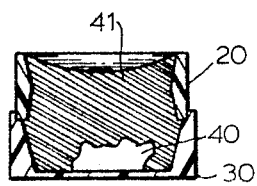
FIGURE 8 is a section view showing the structure with the tissue specimen embedded in the solidified paraffin.

The first element of the composite receptacle and embedding structure 10 is a perforated top 11 which includes a rectangular central wall or plate 12 and perpendicularly extending sides 13, 14, 15 and 16. Sides 13, 14, 15 and 16 are integrally connected to plate 12 along selected edges thereof and each selected side interconnects with two adjacent sides at right angles to form, in combination with plate 12, an open ended rectangular box. Perforated top 11 serves as a means for admitting the various process fluids including hot liquid paraffin into the composite structure 10 and the perforations are provided by a plurality of openings 17 through which the various liquids may pass. Perforated top 11 may be molded from a thin resilient plastic such as polypropylene which is inert to the various processing liquids and which will withstand temperatures in the range of 60° C. Further, it is contemplated that top 11 will be disposable. Perforated top 11 is also provided with a plurality of knobs 18 which extend upwardly from the top surface of plate 12 and which provide means for spacing several of the structures 10 from each other when the same are stacked vertically during the fixation process and which allows the fixation fluids to enter and leave the openings 17.

The second element of the composite structure 10 is an open mold 20 which may also be molded of the same polypropylene material and is comprised essentially of four integrally connecting walls 21, 22, 23 and 24 which intersect at right angles so as to form an open ended box which is rectangular in cross section. The exterior and interior surfaces of walls 21, 22, 23 and 24 are substantially smooth and flat, the interior surfaces protruding inwardly slightly to form a very shallow V. It has been found that manufacture and molding of the open mold 20 is facilitated by the shaping of the interior wall surfaces in the form of the mentioned shallow V since it allows easy withdrawal of the male mold components employed for the manufacture of mold 20. To further illustrate this point and with reference to FIGURE 7, wall 21 which has a cross sectional shape equivalent to walls 22, 23 and 24 is shown provided with a flat exterior surface 25, opposed end edges 26 and 27 and sloping and converging inner surfaces 28 and 29. Surface 28, if projected, is seen to intersect surface 25 at an angle of 10° and surface 29, if projected, also intersects surface 25 at an angle of 10°; therefore, the obtuse angle of intersection between surfaces 28 and 29 is 160°. While employment of the mentioned shallow V intersection was found to facilitate the manufacture of mold 20 it has also been found that the shape of surfaces 28 and 29 also serves to secure the hardened paraffin body 41, as shown in FIGURES 8, 9, 10 and 11, within mold 20 without requiring the use of projections or like interior configurations on the interior wall surface of mold 20. This is of particular value to the invention since it is desirable to present the least opposition to the flow of processing fluids in and out of the structure of the invention when being employed as a receptacle during processing. Furthermore, the absence of projections or other configurations on the interior wall surfaces of mold 20 makes it practical to position the specimen in base pan 30 with mold 20 and base pan 30 snapped together just prior to embedding. In contrast to the prior art the structure of the invention thus eliminates having to position the specimen in the base pan and then locate the mold on the base pan which will frequently cause the specimen to be moved and require repositioning.

The third element comprising histologic tissue embedding structure 10 is a base pan 30 which like top 11 and mold 20 may be molded of polypropylene material. Base pan 30 includes a thin heat conducting, bottom wall 31 and side walls 32, 33, 34 and 35 which are perpendicularly arranged with respect to bottom wall 31 and in combination with bottom wall 31 form a rectangular open ended box. The exposed edges of side walls 32, 33, 34 and 35 are provided with an interior shelf 37. Shelf 37 adapts base pan 30 to be mounted and snap-fastened onto either open end of mold 20 and limits the depth which the side walls of mold 20 are able to extend downwardly into the cavity formed by the side and bottom walls of base pan 30. Unlike the prior art devices in which the mold and base pan elements only loosely seat together, the securing of base pan 30 to mold 20 provides a substantially leakproof joint which keeps the liquid paraffin from dripping during embedding. Floor 31 of base pan 30 is provided with at least one and preferably a plurality of openings 36 which are located adjacent the corners and edges. Openings 36 allow the various fluids to flow through base pan 30 but are small enough to prevent the specimen from escaping. A diameter of 0.0625 inch is deemed suitable for openings 36. The fact that openings 36 are available but of small diameter and located at the corners and edges establishes a perforate structure for drainage during processing. Openings 36, however, allow retention of a substantially smooth and uninterrupted interior surface on floor 31 of pan 30 for purposes of molding. Further, during molding such paraffin as seeps through openings 36 is insignificant and immediately solidifies whenever pan 30 is on a cool surface. Floor 31 also has the character of being thin and when made of polypropylene and in the order of from 0.020 to 0.050 inch thick it acts like a metal receptacle in being able to conduct heat and rapidly cool the embedded specimen as required just prior to embedding.

Figure 9:
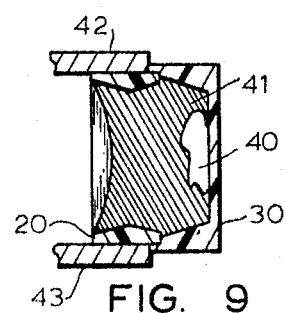
FIGURE 9 is a section view showing the finished unit clamped between opposed jaws of a microtome and the leading edges of the base pan engaged with the jaws and acting as a means for aligning the embedded specimen to be sliced by the microtome cutting blade.

In operation, tissue specimen 40 is placed onto bottom wall 31 of base pan 30. A selected open end of open mold 20 is securely received by shelf 37 of base pan 30 and perforated top 11 is securely snap-fastened onto the other open end of open mold 20. By enclosing tissue specimen 40 in the manner described, the histologic tissue embedding unit 10 is effectively a perforate housing and is adapted to be passed through the various fixation liquids. It is contemplated that a plurality of embedding structures 10 will be placed on top of each other with knobs 18 spacing adjacent embedding structure 10 and the processing liquids pass through openings 17 in perforated top 11, through open mold 20, engage tissue specimen 40 and exit embedding structure 10 through openings 36. The last processing fluid is liquid paraffin which coats the inner surface of floor 31 so that upon the removal of perforated top 11 and the reheating of the floor 31, tissue specimen 40 may be repositioned to present to the microtome blade the selected surface of severance. After tissue specimen 40 has been properly positioned on floor 31 of base pan 30, base pan 30 which still supports open mold 20 is positioned on a flat, relatively cool surface under an orifice which supplies the liquid tissue embedding paraffin to base pan 30 and open mold 20. After substantially filling the cavity formed by base pan 30 and open mold 20 with liquid paraffin, the unit is allowed to cool to form a paraffin block 41 which contracts and assumes the shape as shown in FIGURE 9 and also embeds tissue specimen 40. It can be seen that paraffin 41 extends above the vertex of the V's formed by sloping surfaces 28 and 29 of the walls comprising open mold 20 so that upon the removal of base pan 30, paraffin block 41 is trapped in open mold 20. It will also be appreciated that the thinness of floor 31 facilitates quick cooling of the paraffin.

Figure 10:
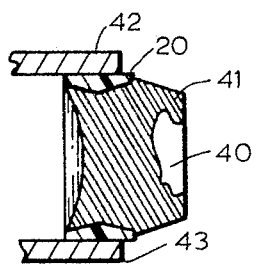
FIGURE 10 is a section view like FIGURE 9 with the base pan removed so as to present the tissue specimen to the knife of the microtome.

With reference to FIGURE 9, it can be seen that base pan 30 is still attached to open mold 20 and while remaining in that position, open mold 20 is positioned between microtome jaws 42 and 43 so that the ends of the same abut against the ends of selected side walls of base pan 30 thus positioning the cutting surface of tissue specimen 40 in an alignment which is substantially parallel to the alignment of the microtome blade 44. This arrangement eliminates the need for the usual flanges on the mold but nevertheless results in accurate alignment. After tissue specimen 40 and paraffin 41 have been secured in microtome jaws 42 and 43 by means of open mold 20, base pan 30 is removed therefrom so as to present tissue specimen 40 to microtome blade 44 as shown in FIGURES 10 and 11. After the required number of tissue slices 45 have been taken from paraffin block 41, base pan 30 may be repositioned onto open mold 20 so as to protect tissue specimen 40 and to provide abutting surfaces if it is ever desirable to replace and realign paraffin block 41 in microtome jaws 42 and 43 for further severance of the same.

While the preferred embodiment of the invention has been disclosed, it is to be understood that changes and variations may be made without departing from the spirit and scope of the invention as claimed.

What is claimed is:

1. A histologic tissue structure having three elements which can be arranged either for transporting a tissue specimen through the usual processing liquids, for molding and housing a paraffin body embedding said tissue specimen, for aligning and holding and presenting said body containing said tissue specimen to a microtome blade for cutting while being held in microtome jaws or for protecting the remaining specimen following said cutting comprising:
   (a) a rectangular open substantially rigid mold formed of a material inert to the usual processing liquids and by a plurality of interconnecting side walls each having parallel exposed edges, said side walls each including a flat smooth exterior surface devoid of flanges and the like and being parallel to a similar surface of an opposed side wall and including smooth interior walls devoid of projections, configurations and the like and converging inwardly from said edges in a shallow V-slope;
   (b) a base pan formed of a material inert to said liquids and by a thin flat rectangular shaped bottom wall and interconnecting side walls extending perpendicularly from the edges thereof, said bottom wall containing at least one opening for draining said liquids, said pan side walls having exposed edges shaped to receive and be detachably secured to the said mold side wall edges in a substantially leakproof connection, said base pan side wall edges being adapted to receive either end of said open mold and being effective to overlap a length of the said exterior surface of said open mold side walls, said mold and base pan when so secured providing a mold for forming a paraffin body embedding a selected tissue specimen, selected said base pan edges being adapted following the molding of said paraffin body to abut against microtome jaws to align said paraffin body for cutting by a microtome blade associated therewith, said mold by itself being adapted to hold said body between said jaws during said cutting and said base pan being detachably resecurable to said open mold following said cutting; and
   (c) a top formed of a material inert to said liquids and by a central wall and interconnecting side walls extending perpendicularly from the edges thereof, said central wall having a plurality of openings for admitting and draining said liquids, said top side walls being detachably securable to the other end of said open mold whereby in combination with said mold and pan to form an integral perforate structure adapted to transporting said specimen through said liquids.

2. The structure of claim 1 wherein a selected one of said open mold exterior side wall surfaces is etched and adapted to receive a graphite type marking pencil.

3. The structure of claim 2 including means appended thereto and effective to keep the said top of one structure separated from the said base pan of another structure when the two structures are placed together.

4. The structure of claim 3 wherein said means comprises knobs protruding from each corner of the said central wall of said top.

5. The structure of claim 1 wherein the said material for each of said mold, pan and top comprises the same moldable material.

6. The structure of claim 1 wherein said base pan bottom wall thickness and material are chosen such that said base pan bottom wall exhibits a heat conductivity substantially equivalent to that of a polypropylene wall 0.020 inch thick to 0.050 inch thick.

7. The structure of claim 1 wherein said base pan bottom wall includes at least one small opening in each corner thereof, each being of sufficient size to drain said liquids.

8. The structure of claim 1 wherein said slope of said interior walls of said mold approximately ten degrees when referred to the vertical.

9. A histologic tissue structure having a set of three operatively cooperative elements which set of elements can be selectively arranged plurally and singularly so as to provide for transporting a tissue specimen through the usual processing liquids, for molding and housing a paraffin body embedding said tissue specimen, for holding and presenting said body containing said tissue specimen to a microtome blade for cutting, for holding the remaining specimen body following said cutting and for providing means such that the specimen indicia may be fixed once to an element surface and thereafter remain with the specimen throughout said transporting, molding, cutting and holding, said set of elements including:
   (a) a substantially rectangular rigid mold element having at least one open end and formed of a material inert to the usual processing liquids and including interconnecting side walls providing substantially smooth exterior surfaces adapted for operational association with mating surfaces of other elements of said set and providing interior surfaces forming a void devoid of internal projections, at least one of said exterior wall surfaces being adapted to receive graphite marking indicia and the like, the end of said mold element opposite said open end being at least sufficiently open to allow flow of said liquids into the said interior void of said mold element during said transporting and said mold element including structural means integrally formed with said mold element walls in a manner enabling a molded specimen body to be secured thereto while preserving said void and the adaptability to flow of said liquids into said void;

(b) an open top base pan element formed of a material inert to said liquids and having a thin flat rectangular shaped heat conductive bottom wall and interconnecting side walls extending upwardly therefrom, and being adapted to receive said mold element thereon and with said base pan element to provide a mold for receiving a paraffin like medium and forming a paraffin body embedding a selected tissue specimen with the said body being molded so as to occupy portions of both said pan and mold elements, said pan having an interior configuration adapted to be releasable from that portion of said body occupying said pan element after the forming thereof while allowing the remaining portion of said body to remain secured to said mold element including the said structural means integrally formed therewith; and (c) a top element formed of a material inert to said liquids and having a central wall with a plurality of openings for admitting and draining said liquids, said top element being detachably securable to the said open end of said mold element whereby in combination with said mold element to form a major portion of an integral perforate structure adapted for use in transporting said specimen through said liquids.

References Cited
UNITED STATES PATENTS

| | | |
|---|---|---|
| 2,776,596 | 1/1957 | Eigen. |
| 2,437,713 | 3/1948 | Tannenberg. |
| 3,014,614 | 12/1961 | Carroll et al. |
| 3,319,289 | 5/1967 | McCormick. |

J. HOWARD FLINT, Jr., Primary Examiner

U.S. Cl. X.R.

18—5; 249—134, 141; 264—255